(12) United States Patent
Peters et al.

(10) Patent No.: US 10,724,659 B2
(45) Date of Patent: Jul. 28, 2020

(54) MULTILAYER TUBE FOR GUIDING FUEL FLUID AND METHOD OF MANUFACTURING SAME

(71) Applicant: Cooper-Standard Automotive (Deutschland) GmbH, Hockenheim (DE)

(72) Inventors: Michael Peters, Reiskirchen-Saasen (DE); Dietmar Roloff, Bielefeld (DE)

(73) Assignee: COOPER-STANDARD AUTOMOTIVE (DEUTSCHLAND) GMBH, Hockenheim (DE)

( * ) Notice: Subject to any disclaimer, the term of this patent is extended or adjusted under 35 U.S.C. 154(b) by 272 days.

(21) Appl. No.: 15/983,398

(22) Filed: May 18, 2018

(65) Prior Publication Data

US 2018/0340634 A1 Nov. 29, 2018

(30) Foreign Application Priority Data

May 23, 2017 (EP) .................................... 17172476

(51) Int. Cl.
*F16L 11/04* (2006.01)
*B32B 27/08* (2006.01)
(Continued)

(52) U.S. Cl.
CPC ............... *F16L 11/04* (2013.01); *B32B 1/08* (2013.01); *B32B 27/08* (2013.01); *B32B 27/34* (2013.01); *B29C 48/09* (2019.02); *B29C 48/21* (2019.02); *B29K 2077/00* (2013.01); *B29K 2995/0067* (2013.01); *B29K 2995/0077* (2013.01); *B29K 2995/0082* (2013.01); *B29K 2995/0089* (2013.01); *B32B 2250/24* (2013.01); *B32B 2274/00* (2013.01); *B32B 2307/202* (2013.01); *B32B 2307/54* (2013.01);
(Continued)

(58) Field of Classification Search
CPC .......... F16L 11/04; B32B 27/08; B32B 27/34; B32B 1/08; B32B 2307/558; B32B 2307/7242; B32B 2307/54; B32B 2307/546; B32B 2250/24; B32B 2307/714; B32B 2597/00; B32B 2307/202; B32B 2307/7265; B32B 2274/00; B32B 2307/732; B32B 2605/00; B29K 2077/00; B29K 2995/0067; B29K 2995/0077; B29K 2995/0082; B29K 2995/0089; B29C 48/09; B29C 48/21
See application file for complete search history.

(56) References Cited

U.S. PATENT DOCUMENTS

| | | |
|---|---|---|
| 9,200,731 B2 | 12/2015 | Doshi et al. |
| 2008/0057246 A1 | 3/2008 | Schwitter et al. |
| 2009/0017247 A1 | 1/2009 | Bellet et al. |

OTHER PUBLICATIONS

Plastics Today, "Multilayer fuel tube features inner layer of low extractable PA612: perfect for vehicles powered by fuels that can contain alcohol" in K Show Automotive and Mobility, Extrusion: Pipe & Profile Materials on Aug. 30, 2016.

*Primary Examiner* — Michael C Miggins
(74) *Attorney, Agent, or Firm* — Reising Ethington, P.C.

(57) ABSTRACT

A multilayer tube for guiding fuel fluid or brake fluid. The multilayer tube comprises an outer protection layer, a barrier layer radially within the outer protection layer, an intermediate layer radially within the barrier layer, and an inner layer radially within the intermediate layer. At least two of the layers are co-extruded layers. Each of the barrier layer and the inner layer comprises a partially aromatic polyamide.

14 Claims, 1 Drawing Sheet

(51) Int. Cl.
 B32B 27/34 (2006.01)
 B32B 1/08 (2006.01)
 B29K 77/00 (2006.01)
 B29C 48/09 (2019.01)
 B29C 48/21 (2019.01)
(52) U.S. Cl.
 CPC ... *B32B 2307/546* (2013.01); *B32B 2307/558* (2013.01); *B32B 2307/714* (2013.01); *B32B 2307/7242* (2013.01); *B32B 2307/7265* (2013.01); *B32B 2307/732* (2013.01); *B32B 2597/00* (2013.01); *B32B 2605/00* (2013.01)

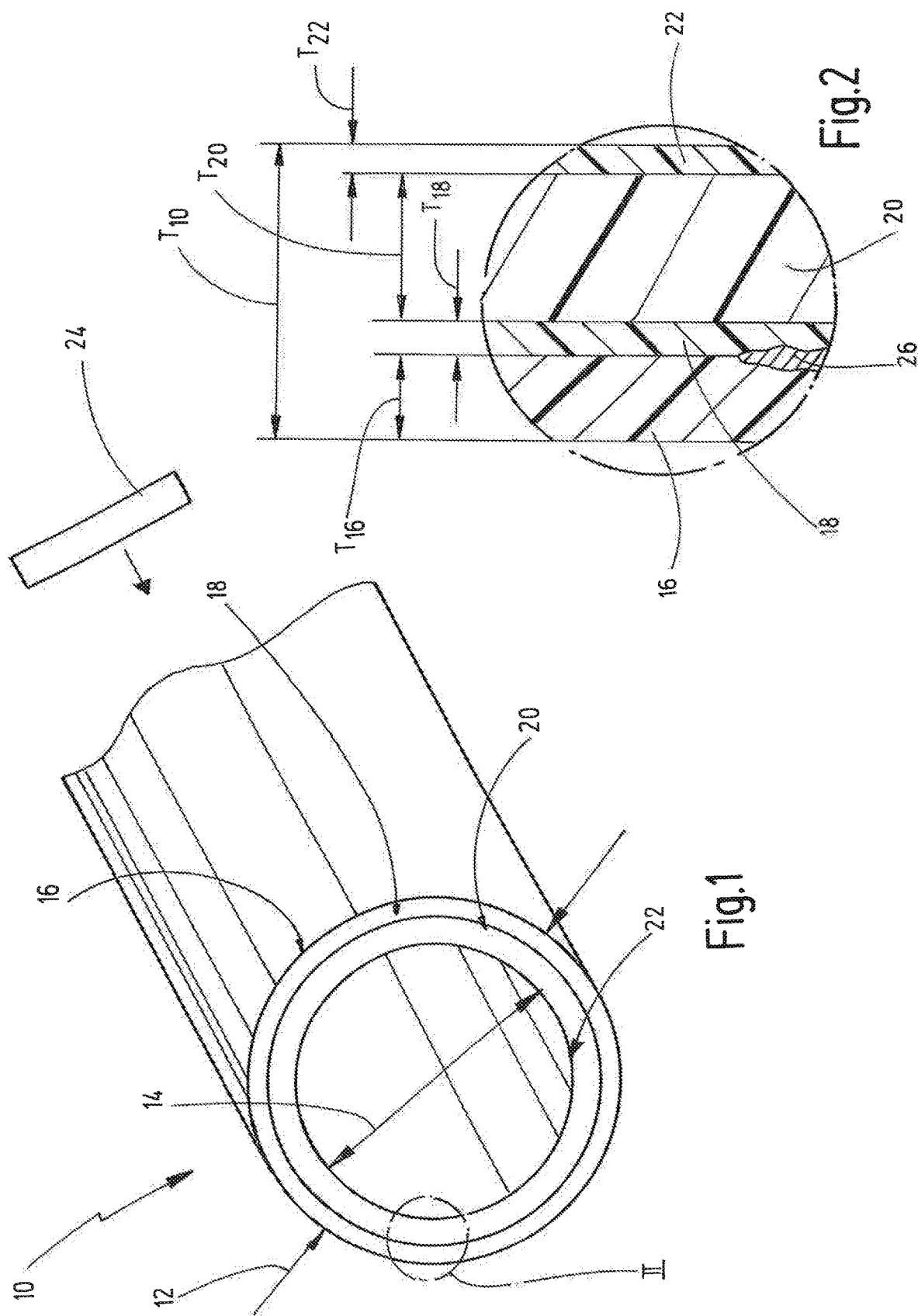

MULTILAYER TUBE FOR GUIDING FUEL FLUID AND METHOD OF MANUFACTURING SAME

CROSS-REFERENCE TO RELATED APPLICATIONS

This application claims the priority of European patent application EP 17 172 476.8 filed May 23, 2017, the entire content of this earlier application being incorporated herein by reference.

BACKGROUND

The present invention relates to a multilayer tube for guiding fuel fluid or brake fluid, comprising an outer protection layer, a barrier layer radially within the outer protection layer, an intermediate layer radially within the barrier layer, and an inner layer radially within the intermediate layer, wherein at least two of the layers are co-extruded layers.

Further, the present invention relates to a method of manufacturing a multi-layer tube, particularly a multilayer tube as mentioned above.

Multilayer tubes for guiding fuel fluid or brake fluid are used at large scale in automobile applications, e.g. for guiding fuel fluid from a tank to an injection system of an internal combustion engine. In addition, other fluids can be guided through such multilayer tubes, including lubrication fluids, brake fluids etc., wherein the internal pressure within the multilayer tube is preferably below 2 bar.

Multilayer tubes include multiple layers which address certain needs in such tubes.

For example, an outer protection layer is typically provided in order to protect the inner layers again harsh environments, as for example within an engine compartment of a motor vehicle. In these environments, both mechanical and heat stress can occur, but also the exposure to fluids like water, oil, etc. that should not intermix with the fluid that is guided within the multilayer tube.

On the other hand, the inner layer comes into contact with the fluid to be guided. In case that the fluid is for example a fuel fluid that contains alcohol or similar substances, it must be ensured that the inner layer has a high wash-out resistance.

The intermediate layer, typically, provides a certain rigidity and stability of the tube.

Finally, the barrier layer has the task to provide a barrier between the inside of the multilayer tube and the outside of the multilayer tube, for example a good barrier ability with regard to ethanol fuel, e.g. CE10.

In the prior art, it is well known to use EVOH (ethylen vinyl alcohol copolymer) as a base material for the barrier layer. Further, it is known to use polyamide for the outer protection layer and/or for the intermediate layer. In combination, it is known to provide adhesive layers between the polyamide layers and the EVOH barrier layer.

Further, it is known to use, as an inner layer, a low extractable polyamide 6.12 (Plastics Today, "Multilayer fuel tube features inner layer of low extractable PA612: perfect for vehicles powered by fuels that contain alcohol" in K Show, Automotive and Mobility, Extrusion: Pipe & Profile Materials on Aug. 30, 2016).

SUMMARY

In view of the above, it is the object of the disclosure to provide an improved multilayer tube and an improved method of manufacturing such multilayer tube.

The above object is achieved by a multilayer tube for guiding fuel fluid or brake fluid, comprising an outer protection layer, a barrier layer radially within the outer protection layer, an intermediate layer radially within the barrier layer, and an inner layer radially within the intermediate layer, wherein at least two of the layers are co-extruded layers, and wherein each of the barrier layer and the inner layer comprises a partially aromatic polyamide.

Further, the above object is achieved by a method of manufacturing a multi-layer tube, particularly a multilayer tube according to the disclosure, comprising the steps of providing an extrudable outer protection layer material for an outer protection layer, providing an extrudable barrier layer material for a barrier layer, wherein the barrier layer material comprises a partially aromatic polyamide, providing an extrudable intermediate layer material for an intermediate layer, providing an extrudable inner layer material for an inner layer, wherein the inner layer material comprises a partially aromatic polyamide, and co-extruding at least two of the layers.

According to the disclosure, the use of a partially aromatic polyamide (also known as semi-aromatic polyamide) as a main material for a barrier layer has the advantages of a good CE10 barrier ability and a good adhesiveness to aliphatic PA. Therefore, it is, in general, not necessary to provide an adhesive layer between the barrier layer and adjacent layers, if those adjacent layers are made of aliphatic PA. In addition, partially aromatic polyamides can be master-formed at mild processing temperatures, which are at least similar to those of aliphatic PA, which material is preferably used for an outer protection layer and an intermediate layer. Therefore, the partially aromatic polyamide and the aliphatic PA can be processed at similar temperatures in a co-extruding tool.

Also, the partially aromatic polyamide can provide a high impact strength and can have a low oligomer content.

The partially aromatic polyamide can be any material selected from the group of PA 9-T, PA-MXD6, PA6I/6T, PA6/6I, PA6I/MXDI, or similar materials which have a good permeation resistance particularly against CE10.

The adjacent material(s) of the barrier layer and of the inner layer is/are preferably an aliphatic polyamide.

The inner layer is also formed of a partially aromatic polyamide. The partially aromatic polyamide has a low wash-out capability against the above mentioned fluid, particularly against fuel fluid, in particular CE10.

In addition, the partially aromatic polyamide has higher usage temperatures than EVOH.

In addition, partially aromatic polymers are available at lower cost than competing conductive fluor polymer solutions like PTFE (Polytetrafluorethylene).

The barrier layer and the inner layer both comprise a partially aromatic polyamide. Preferably, the main material of the barrier layer and/or the inner layer is the partially aromatic polyamide. Preferably, the barrier layer and/or the inner layer comprise at least 90%, preferably at least 95% partially aromatic polyamide, and preferably consist in full of a partially aromatic polyamide.

The barrier layer and the inner layer both comprise a partially aromatic polyamide. Preferably, the barrier layer and the inner layer comprise the same partially aromatic polyamide. However, the barrier layer and the inner layer can be made of different grades of the partially aromatic polyamide.

The above object is achieved in full.

Preferably, the partially aromatic polyamide is PA-MXD6.

The PA-MXD6 is an MX-Nylon, and available for example from Mitsubishi Gas Chemical Company, Inc. PA-MXD6 is a crystalline polyamide resin which is preferably produced through poly-condensation of meta-xylylene diamine (MXDA) with adipic acid.

PA-MXD6 is an aliphatic polyamide resin which has the following distinguished properties compared with other conventional polyamide resins such as PA6 or PA6.6, namely a higher tensile and flexural strength and modulus, a higher glass transition temperature, a lower water absorption, a wider processing window, and a excellent gas barrier properties.

PA-MXD6 presents each of the above mentioned advantages and is particularly useful in combination with an outer protection layer and/or an intermediate layer made of PA6.12 and/or PA6.

It is, therefore, preferable if the outer protection layer comprises at least one of PA6, PA12, PA6.12, PA6.6, PA11, PA6.10 and/or PPA (polypthalamide), or comprises a thermoplastic elastomer.

The thermoplastic elastomer can be any thermoplastic elastomer including the families of TPU (thermoplastic polyurethanes) and TPC (TPE-E, thermoplastic polyester elastomers or thermoplastic co-polyesters), providing sufficient adhesion to adjacent layers.

In another preferred embodiment, the intermediate layer comprises at least one of PA6, PA12, PA6.12, PA6.6, PA11, PA6.10, PA10.10 and/or PPA (polypthalamide), or comprises a thermoplastic elastomer (TPE, including the families of TPU and TPC).

It is further preferred if the inner layer is an electrically conductive layer. In this respect, it is preferred if the requirements of SAE J220 are achieved, which standard defines the criteria for a surface resistivity level.

In another preferred embodiment, the nominal layer thickness of the inner layer is in a range from 0.05 mm to 0.2 mm, particularly in a range from 0.075 mm to 0.17 mm, and particularly preferably in a range from 0.08 mm to 0.15 mm.

The layer thickness of the inner layer, which comprises a partially aromatic polyamide, is preferred in this range so as to balance costs and functionality.

In addition, it is preferred if a supplemental layer is provided between the outer protection layer and the barrier layer.

Although, due to the general adhereability between the outer protection layer and the barrier layer, which makes unnecessary an adhesive layer therebetween, it may be preferred to provide a supplemental layer therebetween which provides (the same or improve) adhesiveness between the outer protection layer and the barrier layer, but also provides functional improvement with regard to cold impact strength etc.

In another preferred embodiment, the intermediate layer and the barrier layer are directly adjacent to each other and/or the intermediate layer and the inner layer are directly adjacent to each other.

In this case, no adhesive or supplemental layers are provided therebetween, thus simplifying the general design of the multilayer tube.

According to another preferred embodiment, a ratio of the nominal layer thicknesses of the barrier layer and the inner layer is in a range from 1:0.5 to 1:2, and/or a ration of the nominal layer thicknesses of the barrier layer and the intermediate layer is in a range from 1:2 to 1:10, and/or a ratio of the nominal layer thicknesses of the inner layer and the intermediate layer is in a range from 1:2 to 1:10.

With any of these ratios, the overall performance of the multilayer tube can be improved.

The term nominal layer thickness refers to a layer thickness that a co-extruding tool is adjusted to. However, the actual layer thicknesses may significantly deviate from the nominal layer thicknesses, in view of the co-extrusion process.

A preferred outer diameter of the multilayer tube is in a range from 5 mm to 25 mm, particularly in a range from 6 mm to 15 mm. An inner diameter of the multilayer tube is preferably in a range from 3 mm to 12 mm, particularly in a range from 4 mm to 10 mm, and most preferred in a range from 4 mm to 7 mm.

The radial nominal thickness of the inner layer is preferably in a range from 0.05 mm to 0.2 mm as mentioned above.

The nominal radial thickness of the intermediate layer is preferably in a range from 0.25 mm to 1 mm, particularly in a range from 0.3 mm to 0.7 mm.

The nominal radial layer thickness of the barrier layer is preferably in a range from 0.025 mm to 0.4 mm, particularly in a range from 0.05 mm to 0.2 mm.

The nominal radial layer thickness of the outer protection layer is preferably in a range from 0.1 mm to 0.6 mm, particularly in a range from 0.2 mm to 0.5 mm.

The material of the outer protection layer is preferably PA6.12, the material of the intermediate layer is preferably PA6.

The multilayer tube according to the disclosure can be used in environments with high temperatures. The multilayer tube can have low wash-out and high conductive properties. The construction is targeted at applications with higher temperatures than EVOH would allow, but with similar permeation resistance. MX-nylon is presently available as PA-MXD6 from Mitsubishi Gas Chemical Company. However, MX-nylon is also available from other manufactures, for example, Solvay.

It will be understood that the features of the disclosure mentioned above and those yet to be explained below can be used not only in the respective combination indicated, but also in other combinations or in isolation, without leaving the scope of the present invention.

BRIEF DESCRIPTION OF THE SEVERAL VIEWS OF THE DRAWING

Exemplary embodiments of the disclosure are explained in more detail in the following description and are represented in the drawings, in which:

FIG. 1 shows a schematic cross section of a multilayer tube together with a schematic view of an extruder; and FIG. 2 is a detail II of FIG. 1.

EMBODIMENTS

A multilayer tube according to the disclosure is generally shown in FIG. 1 and given the reference numeral 10.

The multilayer tube 10 has an outer diameter 12, for example 8.0 mm and an inner diameter 14, for example 6.0 mm.

Further, the multilayer tube 10 has an outer protection layer 16. Radially within the outer protection layer, the multilayer tube 10 comprises a barrier layer 18. An intermediate layer 20 is provided radially within the barrier layer 18, and an inner layer 22 is provided radially within the intermediate layer 20.

The four layer 16-22 have been coextruded by an extruder 24 as is shown schematically in FIG. 1.

The main component of the outer protection layer 16 is PA6.12. The main component of the barrier layer 18 is PA-MXD6. The main component of the intermediate layer 20 is PA6. The main component of the intermediate layer 22 is PA-MXD6.

Each of the above materials can be provided in grades that are adapted to the respective function, e.g. as a fuel tube for motor vehicle applications.

In general, each of the barrier layer 18 and the inner layer 22 may comprise a partially aromatic polyamide.

The partially aromatic polyamide is preferably PA-MXD6.

The outer protection layer may comprise of materials such as PA6, PA12, PA6.12, PA6.6, PA11, PA6.10 and/or PPA, or may comprise a thermoplastic elastomer.

Similarly, the intermediate layer 20 may comprise at least one of PA6, PA12, PA6.12, PA6.6, PA11, PA6.10, PA10.10 and/or PPA, or may comprise a thermoplastic elastomer.

The inner layer 22 is preferably an electrically conductive layer. The nominal layer thickness of the inner layer 22 is preferably in a range from 0.05 mm to 0.2 mm.

The inner layer 22 and the intermediate layer 20 are preferably directly adjacent to each other. In other words, no separate adhesive layer is provided therebetween.

Preferably, no such adhesive layer is provided between the outer protection layer 16 and the barrier layer 18. However, in some embodiments, a supplemental layer 26 (see FIG. 2) can be provided therebetween.

The multilayer tube 10 has a nominal radial thickness $T_{10}$, as shown in FIG. 2.

The outer protection layer 16 has a nominal radial thickness $T_{16}$. The barrier layer 18 has a nominal radial thickness $T_{18}$. The intermediate layer 20 has a nominal radial thickness $T_{20}$, and the inner layer 22 has a nominal radial thickness $T_{22}$.

The multilayer tube 10 can be extruded at extrusion speed of approximately 30-40 m/min.

The PA-MXD6 can be provided in a grade that has the following properties:

Tensile property (measured according to ISO527, at 23° C. and at 50% relative humidity:
  Tensile modulus: 2.9 to 3.3 GPa
  Yield strength: 75 to 81 MPa
  Yield elongation: 3% to 5%
  Break strength: 52 MPa to 60 MPa
  Break elongation: 32% to 40%.

In addition, such grade can have the following flexural properties (measured according to ISAO178 at 23° C. and 50% relative humidity):
  Flexural modules: 2.9 to 3.3 GPa
  Flexural strength: 115 to 140 MPa.

In addition, such grade may have the following charpy impact strength (measured according to ISO 179/1 eA, 1 eU at 23° C. and 50% relative humidity):
  Notched 13.2 to 14.4 $kJ/m^2$
  Unnotched 300 to 350 $kJ/m^2$.

Finally, the above grade may be provided with the following CE10 barrier property, as a film at 40° C., cup method: 300 hours):
  CE10 permeability 0.3 to 0.5 $g*mm/(m^2*day)$ The PA-MXD6 can be provided in a grade that has a low price, a good adhesiveness to aliphatic PA, a good chemical resistance, a good cold impact strength, a good cold extrudability and a good CE10 barrier property.

In a multilayer tube that uses PA-MXD6 as a barrier layer and for example PA12 as an outer protection layer, no adhesive is needed. The multilayer tube is tolerable to thicker barrier layers. In addition, the barrier layer is tolerable to direct contact with fuel.

The multilayer tube may provide improved pressure and chemical resistance.

Further, in addition to a simpler structure, a mild process may be established, by using mild processing temperatures at low cost, wherein the resource of a barrier layer can be multiplied.

Finally, the barrier property can be enhanced. The multilayer tube can have a lower oligomer, and can have a rigid structure.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A multilayer tube for guiding fuel fluid or brake fluid, comprising:
   an outer protection layer;
   a barrier layer radially within the outer protection layer;
   an intermediate layer radially within the barrier layer; and
   an inner layer radially within the intermediate layer;
   wherein at least two of the layers are co-extruded layers, and wherein each of the barrier layer and the inner layer comprises a partially aromatic polyamide, and wherein the partially aromatic polyamide is PA-MXD6 which is an aliphatic polyamide resin.

2. The multilayer tube according to claim 1, wherein the outer protection layer comprises at least one of PA6, PA12, P6.12, PA6.6, PA11, PA6.10 and PPA.

3. The multilayer tube according to claim 1, wherein the outer protection layer comprises a thermoplastic elastomer.

4. The multilayer tube according to claim 1, wherein the intermediate layer comprises at least one of PA6, PA12, P6.12, PA6.6, PA11, PA6.10, PA10.10 and PPA.

5. The multilayer tube according to claim 1, wherein the intermediate layer comprises a thermoplastic elastomer.

6. The multilayer tube according to claim 1, wherein the inner layer is an electrically conductive layer.

7. The multilayer tube according to claim 1, wherein the nominal layer thickness of the inner layer is in a range from 0.05 mm to 0.2 mm.

8. The multilayer tube according to claim 1, wherein a supplemental layer is provided between the outer protection layer and the barrier layer.

9. The multilayer tube according to claim 1, wherein the inner layer and the barrier layer are directly adjacent to each other.

10. The multilayer tube according to claim 1, wherein a ratio of a nominal layer thickness of the barrier layer and of a nominal layer thickness of the inner layer is in a range from 1:0.5 to 1:2.

11. The multilayer tube according to claim 1, wherein a ratio of a nominal layer thickness of the barrier layer and of a nominal layer thickness of the intermediate layer is in a range from 1:2 to 1:10.

12. The multilayer tube according to claim 1, wherein a ratio of a nominal layer thickness of the inner layer and of a nominal layer thickness of the intermediate layer is in a range from 1:2 to 1:10.

13. A multilayer tube for guiding fuel fluid or brake fluid, comprising an outer protection layer, a barrier layer radially within the outer protection layer, an intermediate layer radially within the barrier layer, and an inner layer radially within the intermediate layer, wherein at least two of the layers are co-extruded layers, and wherein each of the barrier layer and the inner layer comprises a partially aromatic polyamide.

14. A method of manufacturing a multilayer tube, comprising the steps:
provinding an extrudable outer protection layer material for an outer protection layer;
providing an extrudable barrier layer material for a barrier layer, wherein the barrier layer material comprises a partially aromatic polyamide;
providing an extrudable intermediate layer material for an intermediate layer;
providing an extrudable inner layer material for an inner layer, wherein the inner layer material comprises a partially aromatic polyamide; and
co-extruding at least two of the layers.

* * * * *